(12) United States Patent
Norling

(10) Patent No.: US 9,878,300 B2
(45) Date of Patent: Jan. 30, 2018

(54) REMOVAL OF CONTAMINANTS FROM BUNKER OIL FUEL

(71) Applicant: Poly Shield Technologies Inc., Boca Raton, FL (US)

(72) Inventor: Rasmus Norling, Boca Raton, FL (US)

(73) Assignee: Triton Emission Solutions Inc., San Juan, PR (US)

( * ) Notice: Subject to any disclaimer, the term of this patent is extended or adjusted under 35 U.S.C. 154(b) by 105 days.

(21) Appl. No.: 14/170,429

(22) Filed: Jan. 31, 2014

(65) Prior Publication Data
US 2015/0217261 A1 Aug. 6, 2015

(51) Int. Cl.
| | |
|---|---|
| *C10L 10/00* | (2006.01) |
| *B01J 19/08* | (2006.01) |
| *B01J 19/00* | (2006.01) |
| *C10G 31/06* | (2006.01) |
| *C10G 31/08* | (2006.01) |

(Continued)

(52) U.S. Cl.
CPC ......... *B01J 19/088* (2013.01); *B01J 19/008* (2013.01); *C10G 19/02* (2013.01); *C10G 21/06* (2013.01); *C10G 31/06* (2013.01); *C10G 31/08* (2013.01); *C10G 33/02* (2013.01); *C10G 53/04* (2013.01); *C10G 53/12* (2013.01); *C10G 2300/202* (2013.01)

(58) Field of Classification Search
CPC ....... B01J 19/008; B01J 19/088; C10G 19/02; C10G 21/06; C10G 31/06; C10G 31/08; C10G 33/02; C10G 53/04; C10G 53/12; C10G 2300/202

USPC .......................................................... 44/629
See application file for complete search history.

(56) References Cited

U.S. PATENT DOCUMENTS

| | | | |
|---|---|---|---|
| 3,255,571 A | 6/1966 | Walker et al. | |
| 3,620,959 A * | 11/1971 | Murdock, Sr. ......... | C10G 33/02 204/665 |

(Continued)

FOREIGN PATENT DOCUMENTS

| | | |
|---|---|---|
| CN | 101475832 A | 7/2009 |
| CN | 102451578 A | 5/2012 |

(Continued)

OTHER PUBLICATIONS

Ye et al, "Pretreatment of Crude Oil by Ultrasonic-electric United Desalting and Dewatering," *Chinese Journal of Chemical Engineering* 16(4):564-569, 2008.

(Continued)

*Primary Examiner* — Latosha Hines
(74) *Attorney, Agent, or Firm* — Seed IP Law Group LLP

(57) ABSTRACT

A system and method for cleaning sulfur and other pollutants from bunker oil to be used for fuel in large cargo ships is described. Preferably, the system includes two or more stages having a mixer to create an emulsion of oil and water. One or more treatment chemicals are added to the water before it is mixed with the oil in order to assist in separating the sulfur from the oil and freeing it up so that it can combine with various other molecules present in the water or be dissolved in the water. The emulsion may pass through a microcavitation chamber as well as an electrolysis reactor chamber in order to further clean the fuel oil by removing additional sulfur content. The clean fuel is sent to a fuel service tank for use in a diesel engine combustion cycle.

12 Claims, 8 Drawing Sheets

(51) Int. Cl.
*C10G 33/02* (2006.01)
*C10G 53/04* (2006.01)
*C10G 53/12* (2006.01)
*C10G 19/02* (2006.01)
*C10G 21/06* (2006.01)

(56) References Cited

U.S. PATENT DOCUMENTS

| | | | |
|---|---|---|---|
| 3,806,437 A | 4/1974 | Franse et al. | |
| 4,415,434 A | 11/1983 | Hargreaves et al. | |
| 4,722,781 A * | 2/1988 | Swartz | C10G 31/08 208/177 |
| 5,271,841 A | 12/1993 | Hart | |
| 5,378,441 A * | 1/1995 | Frankiewicz | B01D 53/1425 423/220 |
| 5,593,889 A * | 1/1997 | Valentine | C10G 32/00 435/262 |
| 6,402,939 B1 | 6/2002 | Yen et al. | |
| 9,540,571 B2 | 1/2017 | Norling | |
| 2004/0079680 A1 | 4/2004 | Gunnerman | |
| 2005/0145509 A1 | 7/2005 | Sams | |
| 2006/0143978 A1* | 7/2006 | Hwang | B01F 3/0807 44/639 |
| 2006/0237318 A1* | 10/2006 | Polnicki | C02F 1/463 204/518 |
| 2008/0156649 A1 | 7/2008 | Sams | |
| 2010/0063271 A1 | 3/2010 | Allan et al. | |
| 2010/0101978 A1 | 4/2010 | Gordon et al. | |
| 2010/0276340 A1 | 11/2010 | Norling | |
| 2010/0290307 A1* | 11/2010 | Gordon | B01F 5/0268 366/104 |
| 2014/0202929 A1 | 7/2014 | Mason et al. | |
| 2015/0144457 A1 | 5/2015 | Ghosh et al. | |
| 2015/0299581 A1 | 10/2015 | Sams et al. | |
| 2016/0010002 A1 | 1/2016 | Norling | |

FOREIGN PATENT DOCUMENTS

| | | | |
|---|---|---|---|
| CN | 202898343 U | 4/2013 | |
| CN | 202899343 U | 4/2013 | |
| CN | 202954003 U | 5/2013 | |
| GB | 2271725 A * | 4/1994 | B01F 5/0656 |

OTHER PUBLICATIONS

International Search Report from PCT/US2015/038904 dated Oct. 5, 2015 (4 pages).
Office Action from U.S. Appl. No. 14/329,850 dated Dec. 5, 2016 (21 pages).
Amendment, filed Mar. 6, 2017, for U.S. Appl. No. 14/329,850, Norling, "Fuel Cleaning System and Method for a Ship," 8 pages.
Notice of Allowance, dated Apr. 6, 2017, for U.S. Appl. No. 14/329,850, Norling, "Fuel Cleaning System and Method for a Ship," 7 pages.
Preliminary Amendment, filed Sep. 26, 2014, for U.S. Appl. No. 14/329,850, Norling, "Fuel Cleaning System and Method for a Ship," 10 pages.
Restriction Requirement, dated Jul. 19, 2016, for U.S. Appl. No. 14/329,850, Norling, "Fuel Cleaning System and Method for a Ship," 5 pages.

* cited by examiner

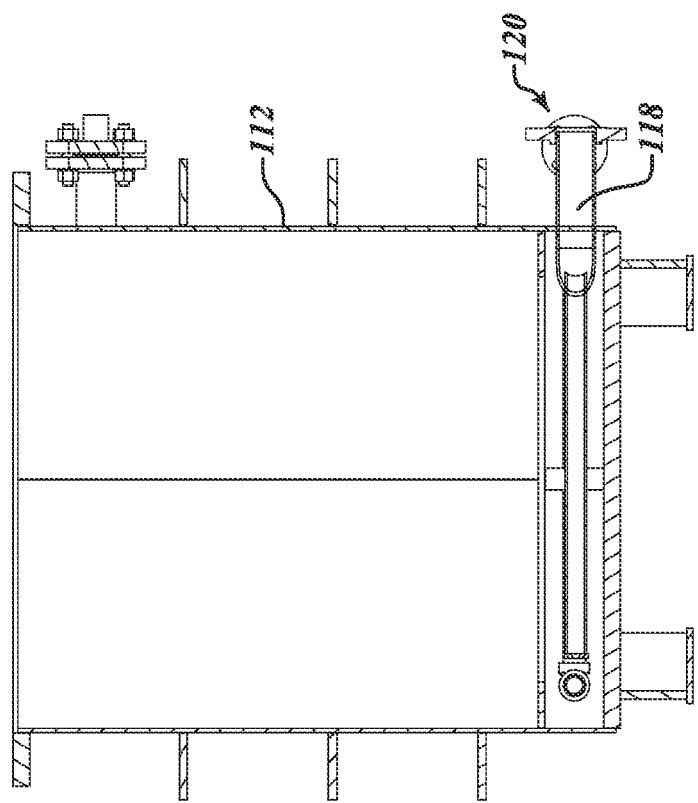
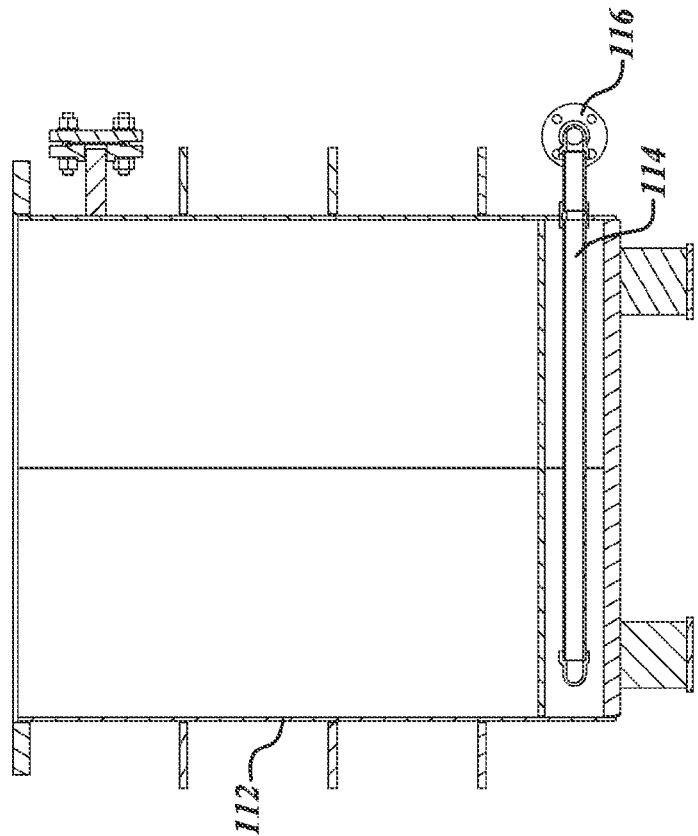

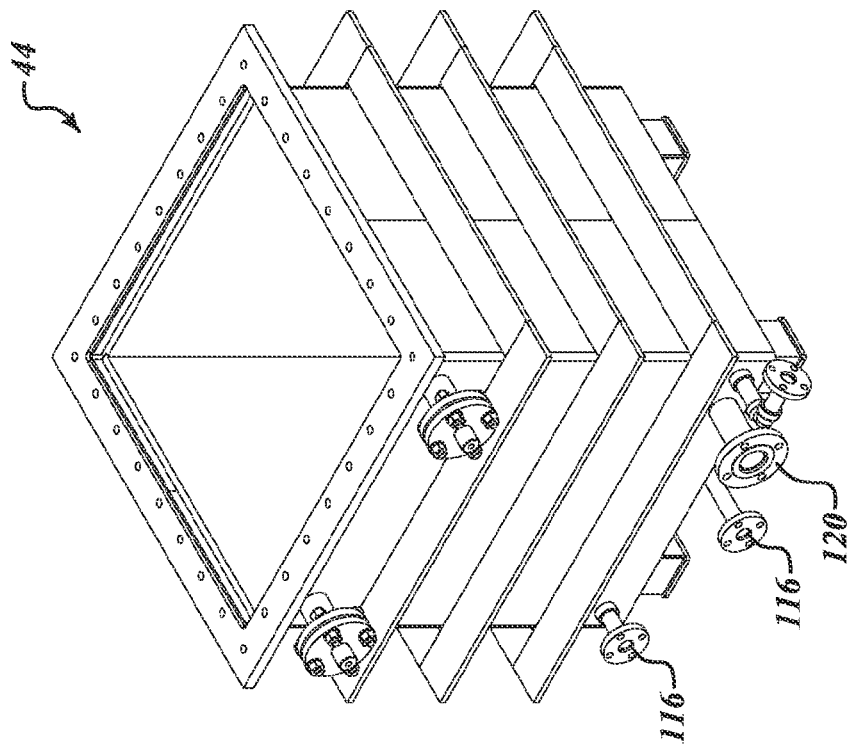
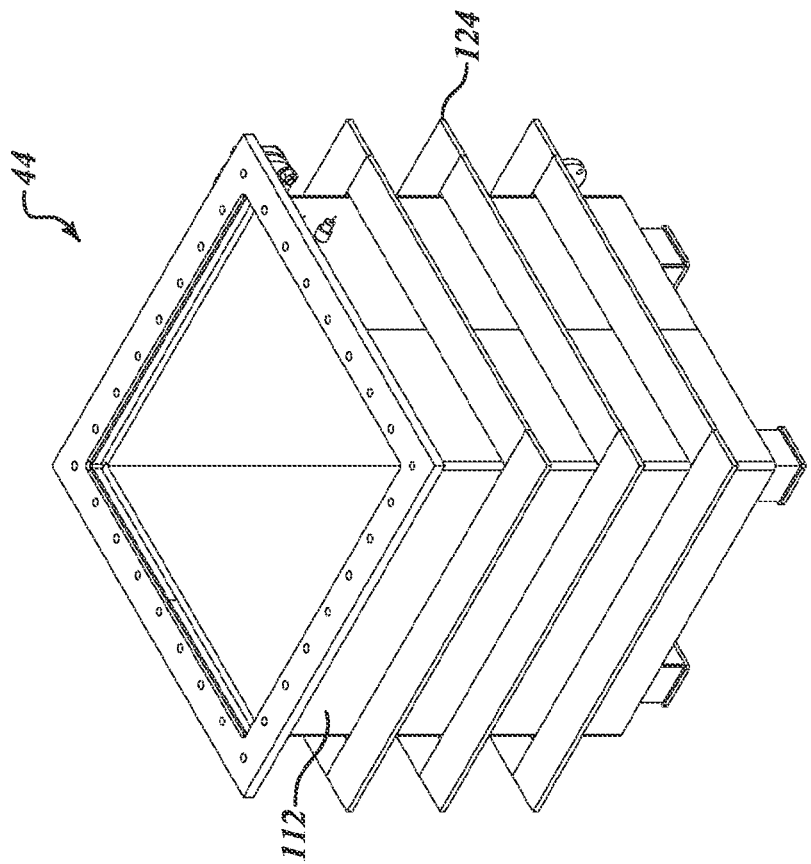

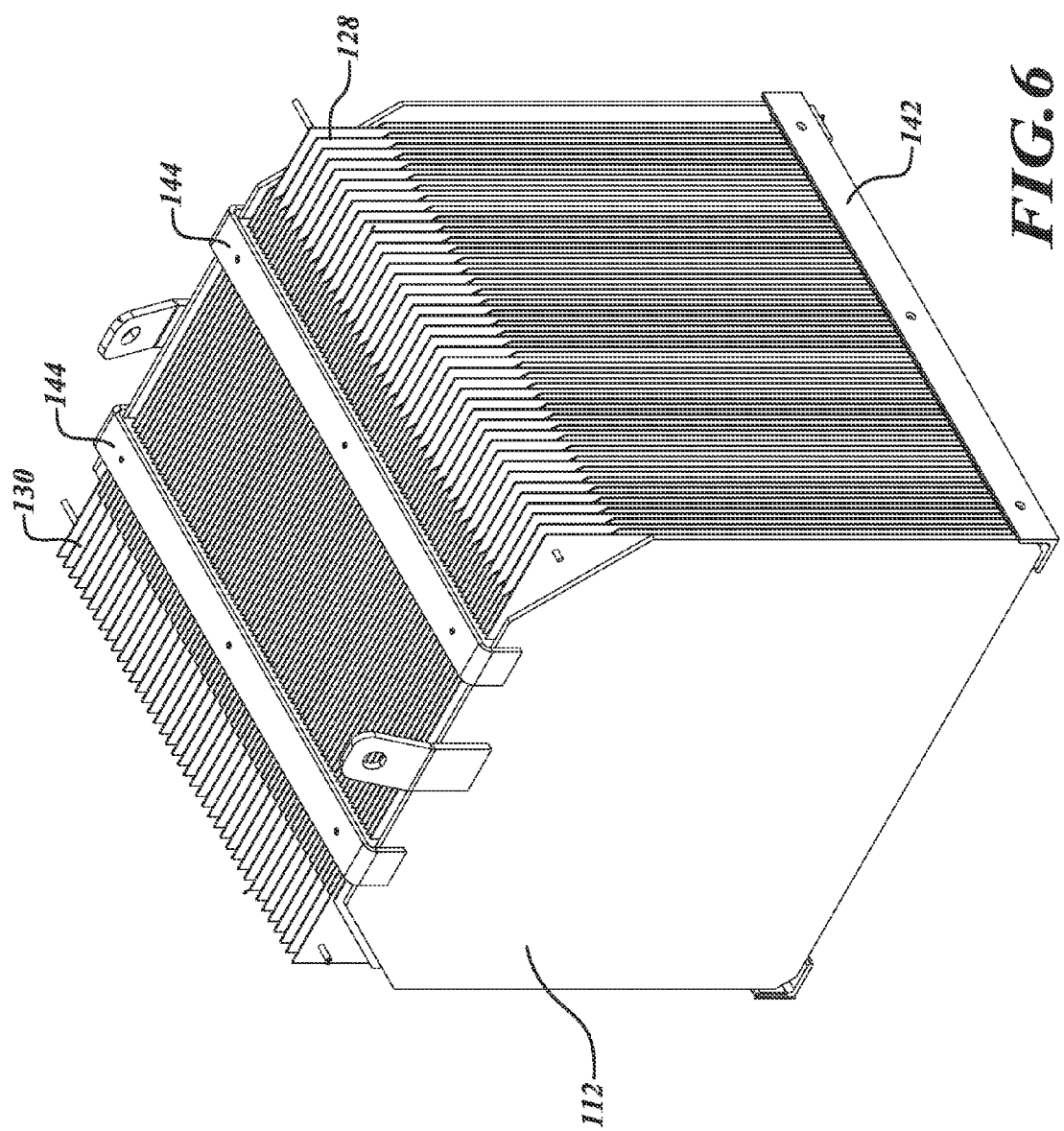

REMOVAL OF CONTAMINANTS FROM BUNKER OIL FUEL

BACKGROUND

Technical Field

This invention is in the field of removing contaminants from diesel fuel and, in particular, the removal of particularly difficult and high pollution contaminants, such as sulfur.

Description of the Related Art

In the past, there have been few, if any, environmental regulations regarding the burning of diesel fuel by ocean-going vessels, such as large cargo ships, container ships, tankers, and luxury cruise liners. As a result, very low quality, dirty fuel has often been used in such vessels, sometimes called bunker oil or bunker fuel. Traditional bunker oil is extremely crude and highly polluting. During the refining of gasoline, higher quality fuel materials such as propane gas, gasoline for cars, and jet fuel are removed from the crude oil and the heavier petroleum products like diesel oil and lubricating oil are then removed leaving bunker oil as the last residue. The bunker oil may therefore contain a high amount of sulfur, often in the range of 3.5% and sometimes in the higher range of 4%-4.5%. Very little, if any, effort is made by the refining company to remove this sulfur from the bunker oil since this would take more time and money and raise the cost of the fuel oil significantly, with few regulations for burning high sulfur oil in a large cargo ship in the middle of the ocean, the oil is sold for this purpose. The bunker oil may also contain other pollutants which may range from lead, antimony, arsenic, styrene and other highly polluting substances.

With the rise of concern about the environment, a number of ship operators would prefer to burn a cleaner fuel and not burn a dirty, low quality bunker with its highly contaminating pollutants. Unfortunately, bunker oil is the commodity product which is widely produced in many locations in the world, and it is difficult and sometimes impossible to obtain bunker oil that does not have high contents of such pollutants, a particular problem being sulfur.

In addition, many ports are issuing regulations that limit the amount of pollutants, such a sulfur and mercury that can be burned while the ship is within the port boundaries. Some of the regulations require that the bunker oil contain less than 0.5% sulfur before it can be used to power a diesel engine within the port boundaries. Since bunker oil having such a low sulfur content is not available on the market, many ship operators must completely shut down their diesel engines when they are docked at a port and use land electric lines for powering systems on the ship which can be extremely expensive for the city to provide the high power capacity of a ship and also expensive for the ship operator to purchase the electricity.

If the ship operator were to attempt to remove the sulfur from the exhaust gas after combustion in the engine, this is not possible with the high level of pollution in most bunker oils. The traditional exhaust gas scrubber and catalytic converter in the form of an SCR normally only works when sulfur level is below 1%. Further, the higher sulfur content will clog the catalytic elements that remove NOx and render them useless for any type of pollution removal. Therefore, the option of scrubbing the exhaust gas and removal of any pollutants from the exhaust smoke stack is not a practical solution for a large cargo ship that is burning bunker oil having a high sulfur content.

BRIEF SUMMARY

According to principles of the various embodiments as discussed herein, an apparatus and method are described which remove a large amount of the pollutants and, in particular, sulfur from the bunker oil while it is in the liquid state, prior to being burned in a combustion engine. The apparatus and method as described herein are able to remove sulfur to a level below 0.5%, and in some embodiments are able to remove the sulfur down to levels below 0.1%. The system is able to operate to clean the fuel onboard the ship as it runs through fuel lines in preparation for being in the diesel engine. The system removes these pollutants, and in particular sulfur, from the bunker oil before it is placed in the fuel service tank so that as the oil is burned, the amount of sulfur in the exhaust gas is less than 0.5%. This is sufficiently low that an SCR catalytic converter and other scrubber can now be used to remove other pollutants from the exhaust smoke, such as NOx. Since the sulfur has been removed from the exhaust gas, an exhaust scrubber can now be used to remove many other pollutants from the exhaust gas since it will no longer be clogged with sulfur. The inventive system permits this achievement by removing sulfur from the bunker oil before it is burned to be within the limits needed for the exhaust gas scrubber to remove other pollutants.

The combination of the removal of sulfur from the liquid bunker oil followed by the removal of any additional sulfur along with a variety of other pollutants from the exhaust gas using the appropriate scrubbers and catalytic converter results in a substantially clean output from the exhaust stack on the huge cargo ship, permitting the cargo ship to dock in port and run its diesel engines while meeting all environmental regulations.

The inventive system as described herein also enables the cargo ship to increase its exhaust gas efficiency and remove even more heat from the exhaust gasses than was previously possible. In the past, it was necessary to keep the exhaust gas at an extremely high temperatures to avoid the sulfur condensing on the sidewalls of the smoke stack which would corrode and destroy the metal lining in a short period of time. With the inventive system as discussed herein, the exhaust gas is sufficiently free of sulfur that the temperature of the exhaust gas can be significantly lower. This permits the capture of substantially more energy from the burning of the diesel fuel and greatly increases the efficiency of the diesel engine itself as well as the exhaust gas boiler. As is known, the lower the temperature of the exhaust gas from a combustion system, the higher the overall efficiency since more energy has been extracted from the combustion cycle. Accordingly, by permitting a lower exhaust gas temperature, the fuel efficient operation of the cargo ship as a whole can be greatly increased.

According to one embodiment, the system includes a fuel flow line through which bunker oil can flow from a storage tank. After the fuel leaves the storage tank, an emulsifying agent is mixed with the fuel in one embodiment in order to increase the affinity of the oil mixing with water. The fuel line then enters a heat exchanger followed by a heater in which it is heated to an appropriate temperature to increase the likelihood of mixing with water. Next, the fuel enters a mixing unit, in which water is sprayed into and mixed with the bunker oil, creating an emulsified blend of diesel fuel and water. The mixing is subject to highly turbulent flow and sprayed through nozzles to encourage complete mixing with the water and oil.

In one embodiment, during the mixing stage, an electric coil that is wrapped around the mixer stage subjects the emulsified fluid to an electric field. The emulsified mixture exits the mixing stage and enters a water/oil separator stage which separates the water from the oil. During the mixing stage, a large amount of the sulfur which was contained in the bunker oil is separated from the oil component of the fuel and transfers to either the water or a gaseous form of sulfur, such as hydrogen sulfide. In a first separator stage, the water which has been separated from the fuel is discarded as waste water and the fuel is output to a pipe to enter a second mixer stage. In the second mixer stage, the fuel is once again mixed in a turbulent flow with water to create an emulsion that contains water and oil. Preferably, during the mixing in the second stage, the emulsion is subjected to an electric field in order to increase the quantity of sulfur which leaves the bunker oil and combines either with the water or with hydrogen gas to form hydrogen sulfide in a gas form, which can be vented.

After the emulsion exits from the second mixer stage, it passes through a microcavitation chamber in which the emulsion is subjected to high intensity acoustic waves that create cavitation bubbles in the emulsion, further increasing the separation of sulfur from the bunker oil. The emulsion then exits the microcavitation and enters a reactor chamber in which an electric current is passed through the emulsion. The electric current passing through the emulsion adds additional energy to further separate individual components of the emulsion. In particular, the electric current which passes through the emulsion will provide sufficient energy to strip some of the remaining sulfur atoms from the bunker oil. In addition, the electric current will provide sufficient energy to split some of the water molecules into the gaseous components of hydrogen and oxygen, creating bubbles of $H_2$ and $O_2$. The gas bubbles of hydrogen will have a great affinity for the sulfur and will create gas molecules of hydrogen sulfide, $H_2S$, which can then be safely vented from the reactor chamber. In addition, some of the hydrogen sulfide may dissolve into the water and create a highly diluted hydrosulfuric acid. The electrolysis of the emulsion also creates oxygen gas from the splitting of the $H_2O$ molecule and the individual oxygen atoms quickly combine either with another oxygen atom to create $O_2$ or with other pollutants in the oil, for example lead resulting in lead oxide; arsenic, resulting in arsenic trioxide sulfur to create sulfur dioxide; or other compounds of oxygen. The emulsion exits from the reactor and enters a water-fuel separator where the water is removed from the oil. The twice cleaned fuel is output for storage in a fuel storage tank and the water is input as the water mixture to the first mixture to be used for mixing with the oil in the first mixer to create the first emulsion.

In one embodiment, prior to the cleaning water being inserted into the mixer of the second stage, one or more treatment chemicals may be added to the water in order to increase the solubility to sulfur. For example, one of the chemicals which may be added in is sodium hydroxide, as known as caustic soda. This creates a strong alkaline solution of the water which, when mixed with the oil, assists in the separation of sulfur from the bunker oil. Sodium hydroxide in water will act to dissolve grease, oil fats and protein deposits. Another chemical which may be used is magnesium oxide which can react with the sulfur in the bunker oil to create magnesium sulfide which is a salt that can be easily removed from the bunker oil. This also provides additional hydrogen atoms to combine with the sulfur to create $H_2S$ and remove the sulfur from the bunker oil compound.

Fuel which passes through the two-stage mixer and water-fuel separator system has been found to have substantial portions of the sulfur removed, resulting in bunker oil which is sufficiently free of sulfur (in the range of 0.5% or lower), and other contaminants that it can be burned while in port and meet pollution control standards. It also permit use of smoke stack scrubbers and catalytic converts in the output exhaust to further remove other contaminants which has not been previously possible for large cargo ships burning standard bunker oil.

BRIEF DESCRIPTION OF THE SEVERAL VIEWS OF THE DRAWINGS

FIGS. 3A-3E are side views of the reactor chamber of FIG. 1.

FIGS. 4A and 4B are perspective views of the housing for the reactor chamber of FIG. 1.

FIG. 6 is an isometric view of the reactor chamber.

DETAILED DESCRIPTION

Figure 1:
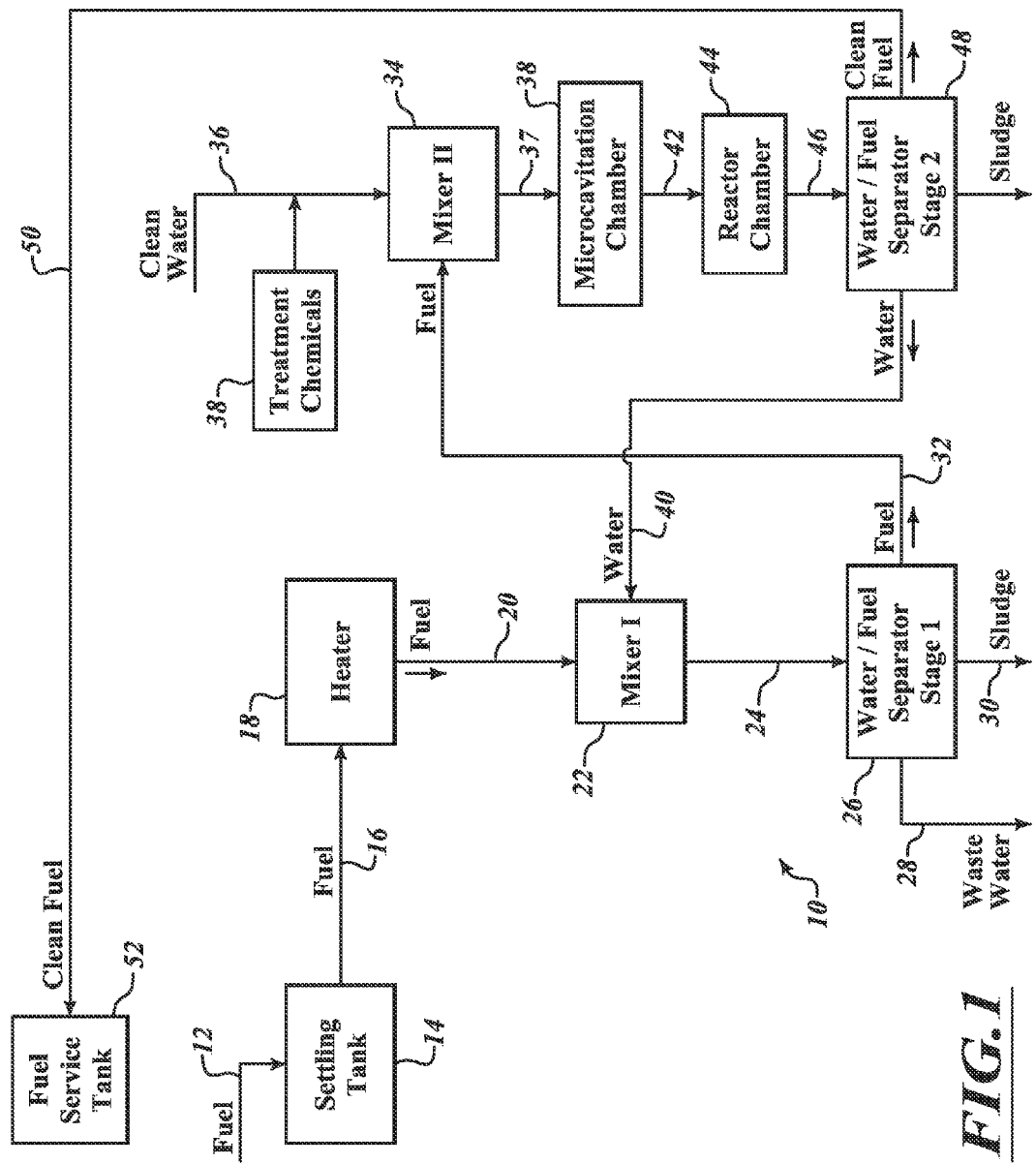
FIG. 1 is a block diagram of a first embodiment.

FIG. 1 is a block diagram of an apparatus 10 that is a system for cleaning bunker fuel to drive diesel engines of large cargo ships according to one embodiment.

The apparatus 10 has a fuel intake location 12 in which uncleaned bunker oil is input to a settling tank 14. The use of settling tanks at the beginning of cleaning systems for bunker fuels are well known in the art and therefore not described in greater detail. The present embodiment is an improvement upon a system that is the subject of a patent application previous filed bearing application Ser. No. 12/779,385 by the same inventor, Rasmus Norling. It was filed on May 13, 2010, as a continuation of an application filed on Nov. 16, 2008. The Norling application has been published as U.S. Patent Publication No. 2010/0276340, published on Nov. 4, 2010 (the '340 Publication"). The '340 Publication is a system for removing salt from fuel oil. The system as described therein is useful for removing such salt, however, it is not effective to remove other contaminants commonly found in bunker oil, the most troublesome being sulfur. As is well known, sulfur is not soluble in water. In addition, sulfur is found in various percentages in oil. As it is pumped from the ground, some oil, notably heavy crude oil, may contain sulfur contents well above 4%. High sulfur crude oil is classified as sour oil rather than sweet crude oil that has a sulfur content of less than 0.5% as pumped form the ground. It is particularly troublesome and expensive to remove sulfur from bunker oil as well as other contaminants which may include arsenic, lead and others as mentioned in the summary herein. Accordingly, a system which is able to remove sulfur and other contaminants from bunker oil would be particularly beneficial to install on large cargo ships in order to enable them to burn the sour crude bunker oil as fuel without polluting the environment. The present apparatus, which will now be explained in more detail, provides a system for removing sulfur from bunker oil prior to combustion.

Turning back now to FIG. 1, the settling tank 14 corresponds to the fuel settling tank 18 of the '340 Publication. The fuel exits the settling tank 14 via a fuel line 16 and passes through a heater 18. The heater 18 heats the oil to a high temperature in order to decrease its viscosity so that it flows more rapidly through the fuel line 16 and also mixes more easily with the water. Since the fuel is going to be mixed with water, it is beneficial to have the fuel at a temperature below the boiling point of water, for example approximately 98° C. The fuel exits the heater 18 through pipe 20 and enters the mixer 22. In the mixer 22, the fuel is sprayed in a turbulent flow into the air while water is sprayed through a plurality of nozzles into the fuel to thoroughly mix the water and the fuel into an emulsion. The mixer 22 corresponds to the static emulsifier 22, also called the bioscrubber, in the '340 Publication. Since the bioscrubber 22 is described and shown in great detail in the '340 Publication, further details of its structure and operation are not provided herein with respect to its internal structure and operation.

While the internal physical structure of the mixer 22 corresponds to the physical structure of the static emulsifier 22 that is the bioscrubber of the '340 Publication, there are a few differences in the present embodiment. A first difference is that the water which is input to the mixer 22 of the present embodiment has one or more chemicals added to it in order to increase the removal of sulfur from the fuel. Accordingly the water, which enters in to the mixer at stage 1 has one or more different chemicals added thereto which, when sprayed in to the mixer 22 will serve to greatly assist in the separation of sulfur and other contaminants from the fuel and also increase the solubility of such contaminants in water based on the form they will take in their reaction with the chemicals in bunker oil as explained elsewhere herein.

Another difference in the mixer 22 is that an electric coil is wrapped around the mixer in order to subject the emulsion to an electric field while it is being turbulently mixed with the water inside the mixer 22. In particular, the mixer 22, having a structure similar to that shown in FIGS. 1A and 9 of the '340 Publication, has a ULF coil wrapped around the entire length of the metal pipe as well as around the inlet to the spray nozzle. The ULF coil, known as an ultralow frequency coil, is supplied with an electrical signal that creates a field through which the water and the emulsion pass during the mixing stage. Preferably, the field varies in frequency from approximately 5,000 Hz to 25,000 Hz. In one embodiment, the field will change frequency in 500 Hz steps approximately every 5 milliseconds, starting at 5,000 Hz and gradually increasing to 25,000 Hz in incremental steps. Once the frequency reaches 25,000 Hz, in one embodiment, the frequency is decreased in 500 Hz steps back to 5,000 Hz, while in other embodiments the frequency restarts at 5,000 Hz and slowly climbs back, in incremental steps to 25,000 Hz, again changing frequency approximately every 5 to 6 milliseconds.

The pipe 20 of the bioscrubber 22 is made of a nonmagnetic metal. Preferably, it is a nonmagnetic stainless steel. One particular type of stainless steel which has been found suitable as a high quality stainless steel is known as a 316L. Stainless steel of the grade 316L is well known in the art to be a very high quality steel that is biocompatible and nonmagnetic. It is sometimes used in high quality mechanisms such as watches and also used when it is important to avoid corrosion and where biocompatibility is important, such as various implants into the body. Of course, other types of metal, stainless steel or the like may be used and high grade stainless steel 316L is just one example of an acceptable metal for the tubing of the mixer 22.

In one embodiment, the frequency of the signal in the ULF coil wrapped around the metal pipe 20 of the mixer 22 may range from approximately a DC voltage up to 30,000 Hz, again incrementing slowly in 500 Hz steps beginning approximately DC voltage and changing frequency in the range of every 6-10 milliseconds until reaching a desired frequency which may be anywhere in the range of 20,000 Hz or 30,000 Hz after which it returns to its starting frequency and begins the cycle again.

The combination of the water together with the chemicals mixed in the water while being subjected to the ULF field in the mixer 22 cause the sulfur in the bunker oil to separate and to enter the emulsion in a form in which it can combine with other chemicals in the emulsion. For example, the sulfur can separate from the petroleum molecule and mix with hydrogen molecules in sodium hydroxide that is used as the treatment chemical. It can also form a gaseous compound of hydrogen sulfide. This is a simply $H_2S$ gas which is very stable and remains in the gas form. The mixer 22 or the separator stage 26 may include a vent which permits the gas form of sulfur to vent and therefore is released from the fuel. In addition, the chemicals and the ULF coil make the sulfur more soluble in water so that some of the sulfur compounds will become soluble in water and will mix with the water as well. The emulsion, with a large amount of sulfur removed from the fuel portion of the emulsion, exits the mixer 22 and enters the water/fuel separator 26.

The water/fuel separator 26 is a known apparatus which efficiently separates oil from water using known techniques. The waste water exits in a waste water pipe 28, heavy particles and sludge exit through a sludge exit 30 and bunker fuel oil which has been cleaned and had some portion of the sulfur removed exits through line 32.

The water/fuel separator 26 can be any one of a number of known types which are available in the commercial market. One particular type of water/fuel separator which is acceptable bears the name "MOPX Separation System." It is sold by the company Alpha Lava Marine Power. This water/fuel separator is a well-known machine widely available in the commercial market and therefore its operational structure need not be discussed in detail.

The water/fuel separator 26 outputs the water through the waste port 28 which now contains some percentage of the sulfur which was formerly in the fuel. In addition, the water fuel separator 26 may contain pressure release valves and air exhaust to permit any sulfur which may be exiting as a gas to vent to the atmosphere or into a sealed capture chamber.

As the fuel leaves the water/fuel separator 26 through line 32, in most embodiments approximately one-half to three-quarters of the sulfur has already been removed from the fuel. For example, if the fuel started with a sulfur percentage of 3%-3.5%, the fuel, as it exits through pipe 32, will have a sulfur content in the range of 1%-1.5% or possibly lower. It is therefore desired to perform additional cleaning steps on the fuel in line 32 in order to remove even more sulfur so as to reduce the sulfur content to the target level of below 0.5%. Accordingly, the fuel in line 32 enters a second stage of mixer 34.

The second stage mixer 34 has the same construction, function and operation as the mixer 22 and therefore will not be described in more detail. The mixer 34 shows clean water coming in through an inlet pipe 36 and, prior to the inlet water entering through pipe 36, treatment chemicals 39 are mixed with the water. In one embodiment, the treatment chemical 39 is sodium hydroxide, also known as caustic soda. In other embodiments, the treatment chemical may be magnesium oxide or other acceptable chemical. The chemicals are selected based on the pollutant to remove from the fuel. It has been found that sodium hydroxide is particularly beneficial to remove sulfur from oil and convert it in a form in which it can be safely removed by one or more mechanisms. The use of sodium hydroxide as a treatment chemical has been found by the inventor to be particularly beneficial to assist in freeing sulfur from the bunker oil. Accordingly, some quantity of sodium hydroxide is added to the water in order to assist in the separation of the sulfur from the oil. As will be later seen, the water which is input to the mixer 22 is the separated water which was input to the mixer in tank 36 and, therefore, still contains the sodium hydroxide. Accordingly, the water which enters the mixer 22 via pipe 40 also contains the sodium hydroxide from the chemical treatment 39 which assists in the removal of sulfur from the fuel.

Turning back now to the second stage, the second stage mixer 34 once again creates an emulsion of oil and water in a bioscrubber of the type previously described and shown in the '340 Publication, except for the addition of the ULF coil which wraps around the pipe as is previously described as one embodiment of the invention. After the emulsion is created, the emulsion exits the mixer 34 via pipe 37 into a microcavitation chamber 38. The microcavitation chamber is approximately one foot wide and four feet long. Attached to the side of this metal microcavitation chamber 38 are a plurality of infrasonic cleaners. Infrasonic cleaners are commercial products which are known in the art today and therefore not described in more detail. A plurality of infrasonic cleaners are applied to the microcavitation chamber 38 in order to create an acoustic wave that passes through the emulsion. The acoustic cleaners add additional energy to the system and create microcavitation bubbles through the emulsion. The microcavitation bubbles are beneficial to separate additional sulfur from the fuel oil so that it can bond with hydrogen, oxygen or other compounds in the water and be separated from the fuel. Preferably, the acoustic wave that is used is in the infrasonic range, as is known in the art. Alternatively, it may be desired in some embodiments to use ultrasonic cleaning units that pass high frequency ultrasonic waves through the emulsion within the microcavitation chamber 38.

The emulsion, having been subjected to the acoustic waves in the microcavitation chamber 38 exits through pipe 42 and into reactor chamber 44. The reactor chamber 44 is shown and described in more detail with respect to FIGS. 3A-6. Simply stated, the reactor chamber 44 has a plurality of large planar plates spaced a short distance from each other and the emulsion runs between the plates. ADC voltage in the range of 12 volts is applied to adjacent plates so that electric current passes from one plate to the next through the emulsion. As the electric current passes through the emulsion, it performs an electrolysis of the emulsion. The electrolysis of the emulsion is very effective to remove sulfur from the fuel. The electrolysis of the emulsion has two effects. A first is the separation of the water molecule into its constituent parts, hydrogen and oxygen. The separation of the water molecule creates hydrogen gas and oxygen gas in a manner well known in the art and, therefore, is not described in detail. This separation provides a large quantity of free hydrogen gas and oxygen gas which can readily mix with the sulfur contained in the fuel. The combining of the sulfur atom with the oxygen and hydrogen can take a number of different form. For example, it can form hydrogen sulfide, a gas. Alternatively it can form sulfur dioxide which is also a gas. In addition, in the presence of the catalyst chemical the water and sulfur can form a compound of $H_2SO_4$, which can be removed as part of the water.

The electrolysis of the emulsion also serves to separate the sulfur from the fuel. Fuel oil of the type used in cargo ships, known as bunker oil, has a number of hydrocarbon combinations therein. Generally, it is a complex mixture of heavy molecular weight hydrocarbons averaging about 30 carbon atoms per molecule but some molecules may have over 45-50 carbon atoms. Generally, the chemical composition of bunker oil is in the range of approximately 15% alkynes, 15% other compounds some of which may include pollutants such as nitrogen, oxygen or sulfur, approximately 25% aromatic hydrocarbons, and approximately 45% cyclic alkanes or other hydrocarbons in the naphthalene group. Depending on the quality of the bunker oil, it may be classified as a number 5 or number 6 bunker oil grade C which has previously been described or, if it is of a higher quality, it may be a bunker oil grade B which is significantly higher quality of oil for burning. Some bunker oils may be referred to as the Navy Special grade. However, many ships choose to burn the low quality bunker oil number 6 or grade C and therefore the additional treatment of the fuel is needed to remove pollutants as explained herein. The chemical compositions and hydrocarbon compounds found in low quality bunker oil are well known in the art and described in many publications and therefore not discussed in detail herein.

The electric current which passes through the emulsion accordingly has the effect of separating the sulfur from the fuel compounds and permitting the sulfur to combine with new molecules which are separated from the fuel and water, among them, sulfuric acid and the like. After the emulsion undergoes electrolysis in the reactor chamber 44, it exits via pipe 46 into the second stage water/fuel separator 48. At the second stage water/fuel separator 48 outputs water via pipe 40 which contains the cleaning chemicals and is input to the mixer stage 22 in order to assist in the first stage cleaning of the fuel. The clean fuel exits pipe 50 and is stored in the fuel service tank 52 for burning by the diesel engines.

A second embodiment 100 of the fuel cleaning system will now be described. Similar structures have similar reference numbers in the second embodiment; however, new structures are given new reference numbers. In the second embodiment of the fuel cleaning system 100, fuel is input to a settling tank 14 via input pipe 12. The fuel exits the settling tank 14 via pipe 16 and enters a recirculation tank 56. The recirculation tank 56 is a relatively small tank which may hold in the range of 500 gallons or less of the fuel. The embodiment that includes the recirculation tank 56 is particularly beneficial if the incoming fuel oil is particularly low quality or contains a large amount of pollutants and, therefore, needs to be subjected to repeated cleaning cycles until it is sufficiently clean for burning. The recirculation tank 56 receives new fuel via pipe 16, and one full the inlet is shut off and the oil is circulated via the recirculation tank until it is sufficiently clean that it can exit. This can be achieved by having a set amount enter the recirculation tank 56 and continuing to clean the fuel, sending it back to the recirculation tank until the entire batch is clean or, alternatively, placing a float or some other level sensor inside the recirculation tank 56 and as clean fuel enters the fuel service tank 52, additional new dirty fuel can be input to the recirculation 56 so that the cleaning can continue.

The oil exits the recirculation tank 56 via line 58 into a heat exchanger 60. The heat exchanger 60 removes some of the heat from the oil which has been circulated through the system the first time in order to reduce the amount of additional energy that must be provided to heat the fuel. If the fuel is not sufficiently hot after exiting the heat exchange 60, then an additional heater may be provided downstream of the heat exchanger 60 in order to further heat the fuel. The fuel exits the heat exchange 60 via fuel line 20 and enters the mixer 22. The mixer 22 operates in a manner similar to that described with respect to FIG. 1 and is not repeated here. The fuel exits the mixer 22 through line 24 and enters the first stage water/fuel separator 26 in which waste water is separated and discarded, sludge is removed and discarded, and the clean fuel exits through pipe 32. The clean fuel enters the second stage mixer 34 where it is mixed with water to create an emulsion and exits via pipe 37 into the microcavitation chamber 38 and, via pipe 42, into the reactor chamber 44 and from the reactor chamber via pipe 46 into a second stage water/fuel separator 48 in a manner similar to that described with respect to FIG. 1 and, therefore, will not be repeated here. Also, as explained in FIG. 1, clean water is input pipe 36 to which are added one or more treatment chemicals of the type previously described in order to increase the separation of the sulfur from the fuel and permit it to bond with other chemicals and create new compound which can more easily be removed from the combination.

Figure 2:
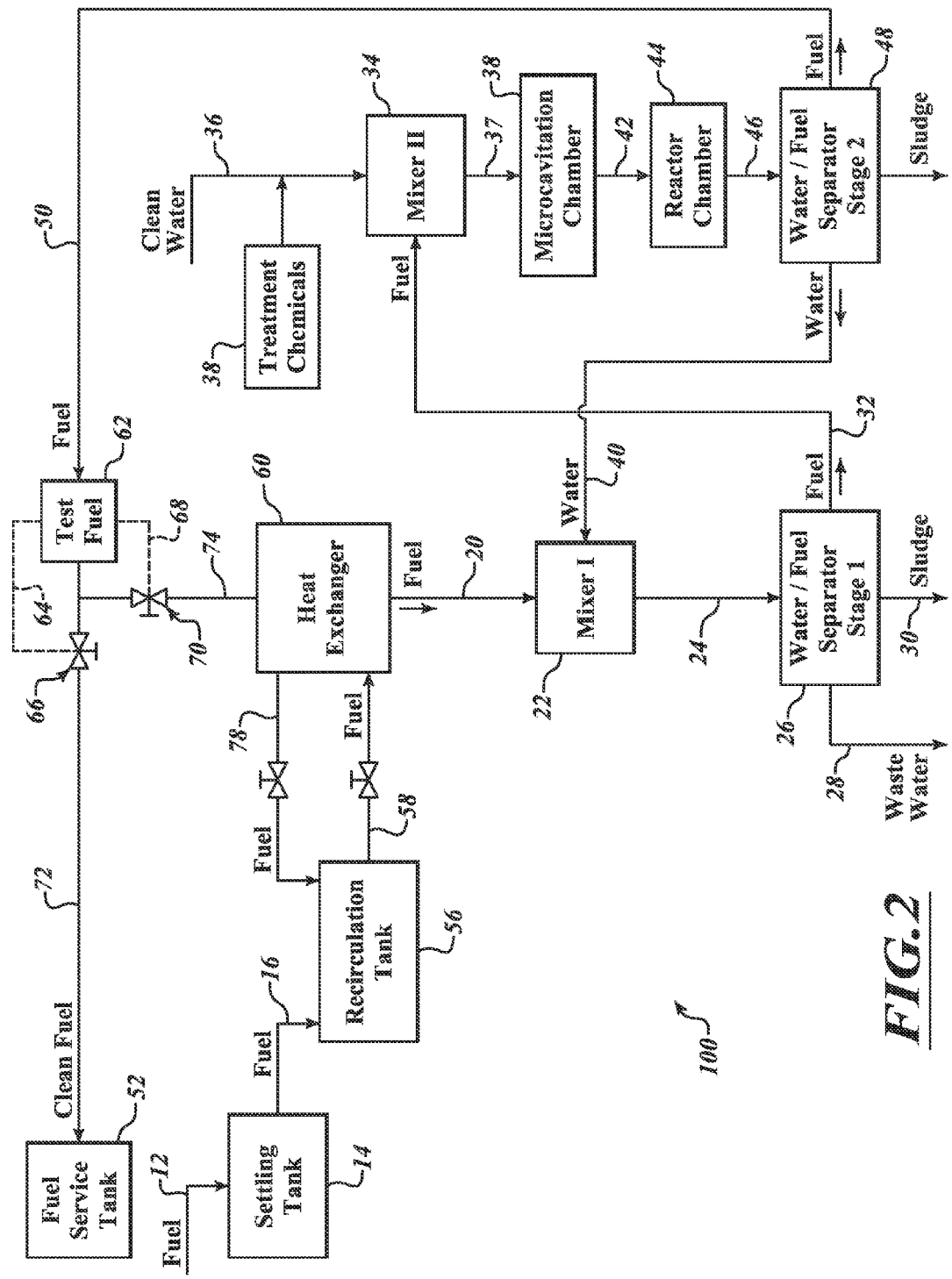
FIG. 2 is a block diagram of a second embodiment.

In the alternative embodiment of FIG. 2, one difference is that as the fuel exits the second stage fuel separator 48 via line 50 and then enters a test station 62. In the test station 62, the fuel is tested for its various properties, including the types of pollutants which remain as well as the quantity. For example, the fuel is tested at the test station 62 to determine whether the sulfur content is below 0.5% or some other low threshold which has been established for the sulfur. If the fuel tests as having had sufficient sulfur removed, an electrical signal is output from the fuel test station 62 via electric line 64 in order to open valve 66. At the same time, a signal is output by the test station 62 via electric line 68 to close valve 70. The clean fuel is output via clean fuel line 72 via open 66 into the fuel service tank and it is blocked from entering the heat exchanger again by the closed valve 50.

On the other hand, if the test station 62 senses that the sulfur content in the fuel does not pass the standard which has been established, then it outputs a signal to close valve 66 and to open valve 70. This causes the fuel to enter pipe 74 and enter the heat exchanger where the heat that was present in the fuel at this stage is passed to the incoming fuel coming in line 58 so as to heat the fuel to some level and thus save some of the heating energy. The once cleaned fuel is output from the heat exchanger 60 via line 78 to enter the recirculation tank 56. The oil which enters the recirculation tank 56 has been completely through one cycle of cleaning which includes the two stage cleaning operation of mixer 1 and mixer 2. It therefore has had substantial portions of the sulfur removed. However, it may still have sufficient sulfur content that additional cleaning is needed. Accordingly, the fuel enters the recirculation tank 56 and then exits via pipe 58 where it passes through the heat exchanger 60 again and passes through the two-stage mixer and cleaning cycle as has been described.

In some embodiments, the fuel will be sufficient clean after just one pass through the cleaning system 100 that it can enter the fuel service tank 52. On the other hand, it may be necessary to circulate the oil two or more times through the system 100 in order to provide sufficient cleaning of the fuel.

In some embodiments, the microcavitation chamber 38 and reactor chamber 44 are placed after the first mixer stage 22 in order to remove more of the sulfur in the first pass. Alternatively, the microcavitation chamber 38 and reactor chamber 44 can be placed in both stages, after the first mixer 22 and also after the second stage mixer 34 in order to increase the cleaning potential of the system. Of course, the addition of the further microcavitation and reactor chambers creates a larger more complex system and, preferably, these chambers are just used one time in the system, after the second stage mixer 34.

The reactor chamber 44 will now be shown in more detail with respect to FIGS. 3A-6.

Figure 3A:
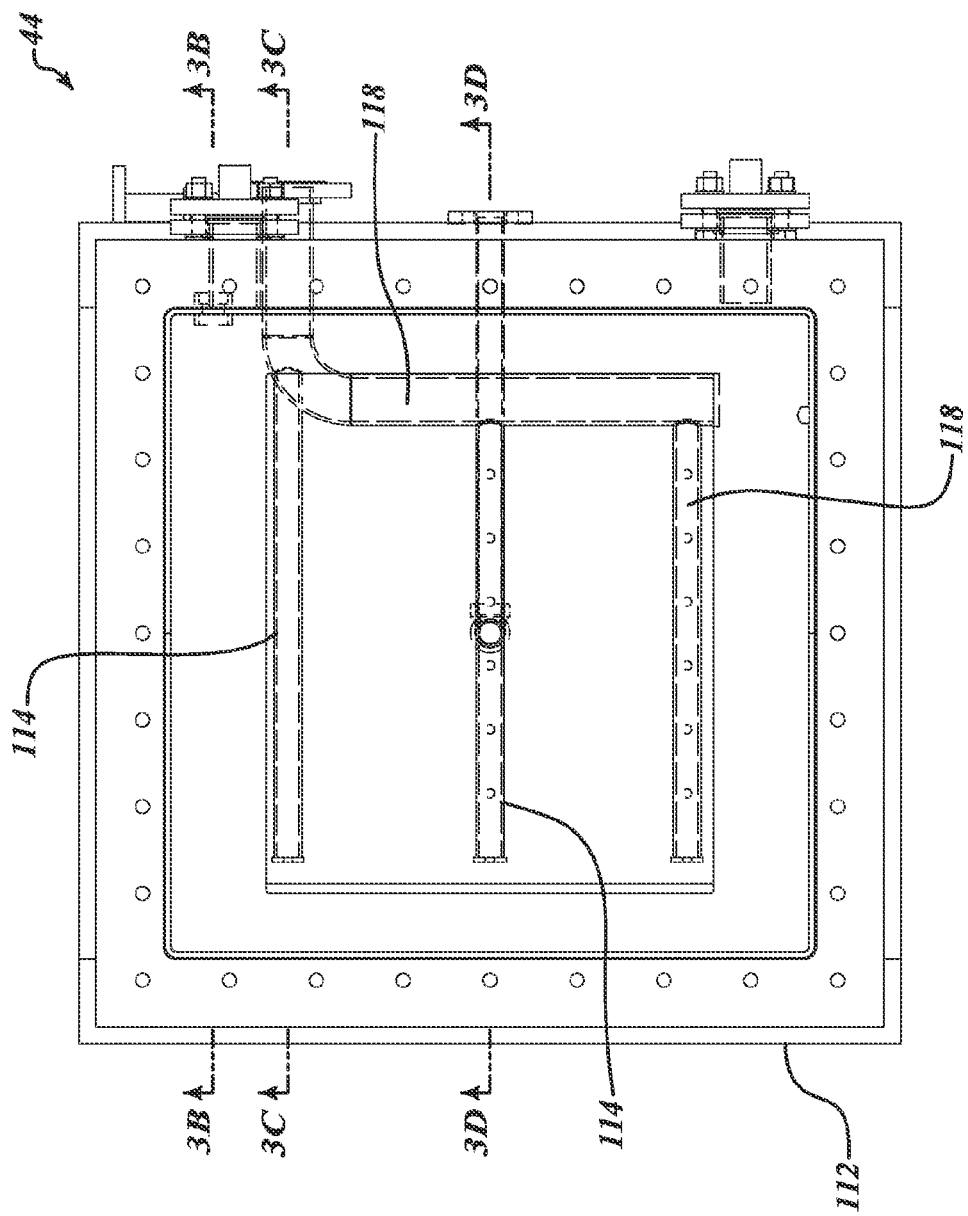
Figure 3E:
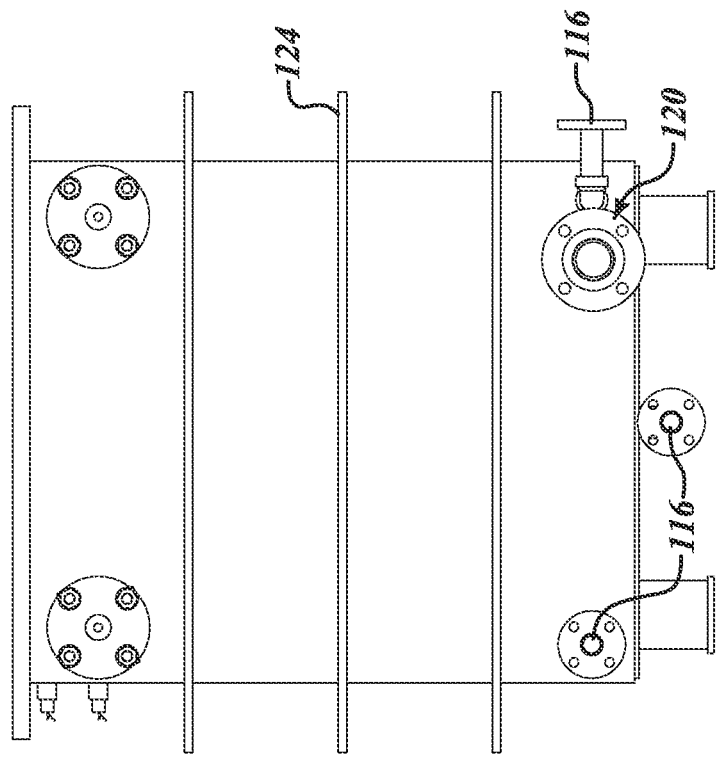
Figure 3D:
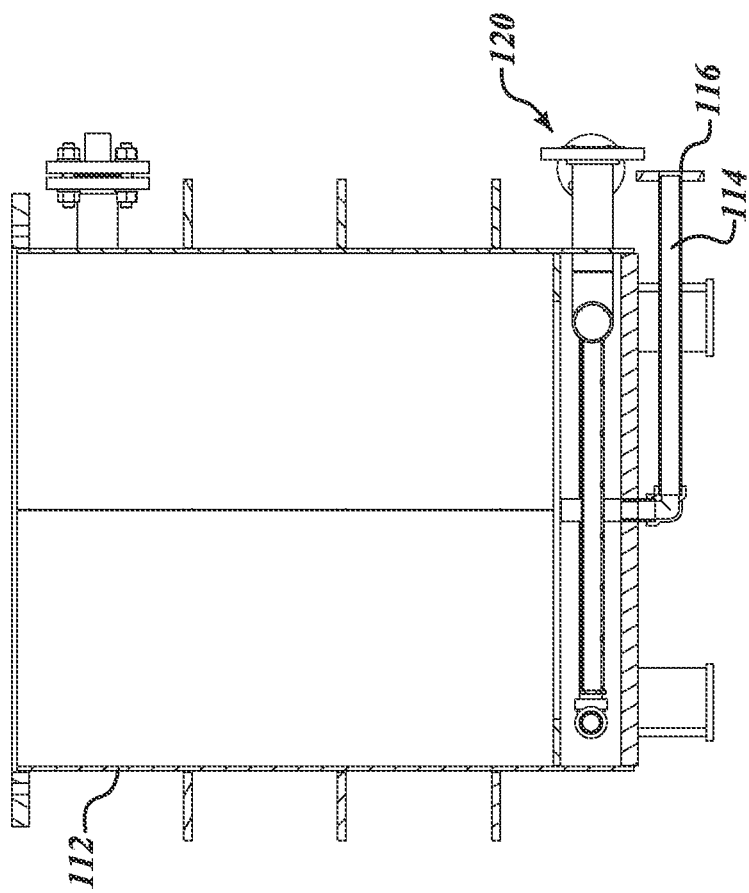

FIGS. 3A-3D show various views of the outside of the reactor chamber 44. FIG. 3A is a partial top plan view of a reactor chamber 44 without the plates installed so that it can be more easily seen. The reactor chamber 44 includes an outer wall 112 having a plurality of inlet pipes 114 and preferably one large outlet pipe 118. The outlet pipe out has outlet 120 while the various inlet pipes have inlet 116. The inlets and outlets are positioned relative to the plates inside the reactor box 44 to ensure that the emulsion passes through a large number of parallel plates before it can exit from the reactor chamber 44. For example, the plates on the inside may be arranged in a serpentine fashion and require that the emulsion follow the serpentine pattern before it can exit in the outlet 120. FIGS. 3B-3C show sections HH, JJ, and KK at the locations shown in FIG. 3A. FIG. 3E is a side elevation view of the reactor chamber shown in FIG. 3A.

FIGS. 4A and 4B show isometric views of the empty reactor box without the plates therein in order to provide a better view. The reactor chamber 44 may include one or more flanges or support plates 124 in order to give strength and stability to the walls 112. As previously explained, the reactor chamber 44 may have one or more inlets 116 and an outlet 120 into which the fuel can be input and output respectively.

Figure 5B:
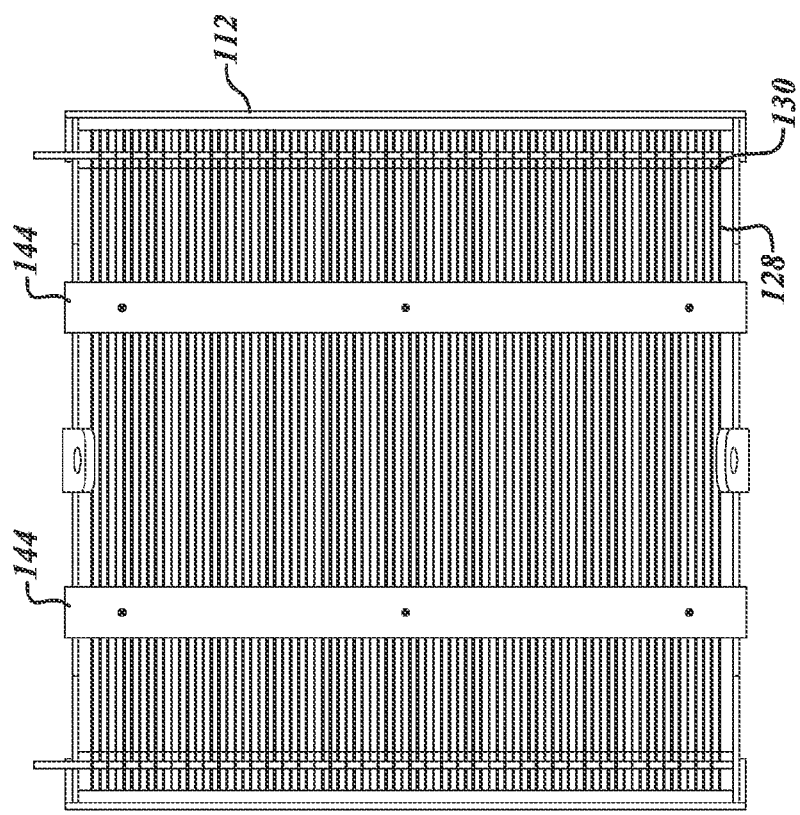
FIG. 5B is a top plan view of the plates of the reactor chamber.
Figure 5A:
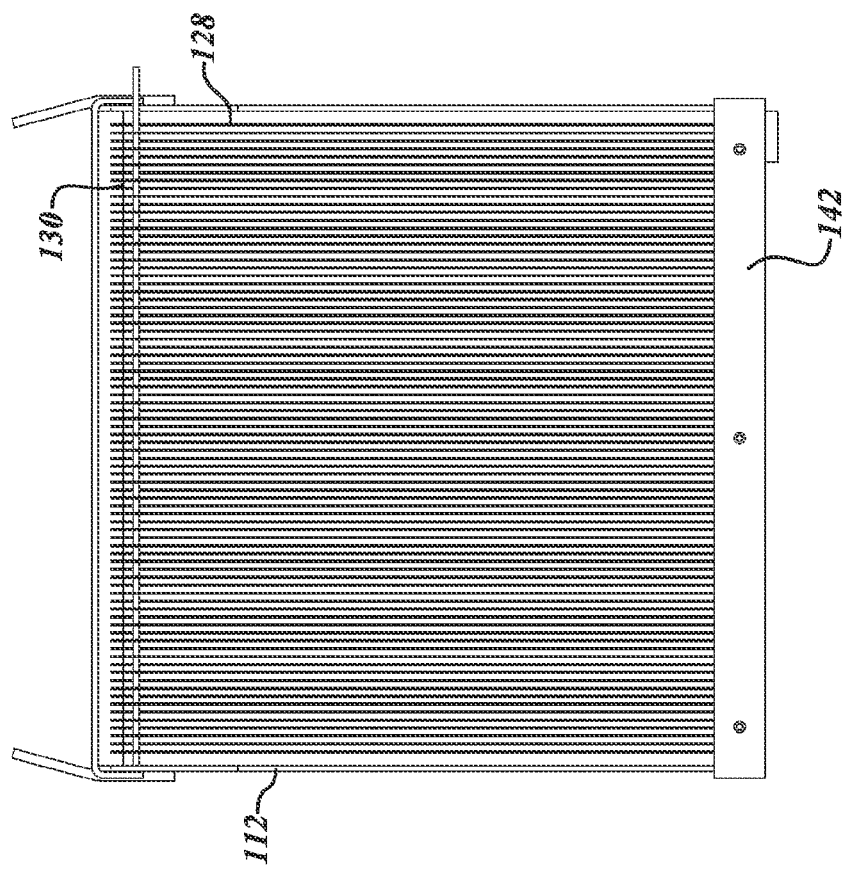
FIG. 5A is a side elevation view of the plates in the reactor chamber.

FIGS. 5A and 5B show a side elevational and a top plan view of the plates in the reactor chamber 44 while they are installed within the chamber, with the side open for easier viewing. The plates include alternating plates 128 and 130 coupled to different voltages. Preferably, the first series of plates 128 are coupled to a DC voltage in the range of 12 volts although voltages in the 6 volt or 24 volt range are all acceptable. Every alternating plate is connected to a lower voltage, such as ground. When the DC current is applied, this causes electric current to pass from plate 128 to plate 130 through the emulsion which is present between the plates. The passing of electric current between the plates breaks some of the molecules apart as previously described and, in particular, is beneficial for removing the sulfur atoms from the hydrocarbon compounds in the bunker oil and permitting the sulfur atoms to bond with either hydrogen, oxygen, or water to form new compounds which then can easily be removed from the emulsion.

The plates are held spaced apart by side brackets 142 and two or more top brackets 144 which have groves in which the plates are positioned in order to keep the plates spaces an exact distance apart to permit the emulsion to easily pass therethrough but be so far apart as to require a high voltage. The plates are preferably made of a high quality stainless steel, for example ER316L or ER316LT1, that does not easily corrode when exposed to fuel oil, sulfur or other compounds. The reactor chamber 44 has a width in the range of approximately 25-26 inches and a height of approximately 22-23 inches. The depth is also in the range of approximately 25 inches. In one embodiment, the sheets are thin sheets having a thickness in the range of 0.06 inches. They are roughened such as by being blast cleaned, sandblasted, or other by other appropriate technique. In one embodiment, there are approximately 40 planar plates which are connected to the positive voltage and approximately 40 plates coupled to ground alternated with each of the plates coupled to the positive voltage. This permits a spacing between the plates of somewhat less than 0.25 inches, taking into account the thickness of the plates. The emulsion passes through these spaces between the plates as the current runs through it from one plate to another.

FIG. 6 is an isometric view of the reactor chamber 44 in which the plates 128 and 130 alternated with each other can more easily be seen, as well as the top brackets 144 which hold the plates a fixed distance apart from each other and the side bracket 142 which serves the same function. As previously described, the emulsion of water and fuel may enter the reactor chamber at one or more distinct locations and then exit at a single location after it has had sufficient time to pass in a serpentine fashion through a plurality of the plates. Also, as previously mentioned, the reactor chamber will have one or more vents in order to permit any gaseous forms of the sulfur compound, which may include hydrogen sulfide, sulfur dioxide, or other gases, to easily escape and thus prevent pressure buildups inside the system.

Various embodiments of a system for cleaning sulfur and other contaminants from bunker oil have been described. As will be appreciated the components as explained herein can be organized in various combinations in order to achieve the appropriate cleaning the bunker oil prior to burning in the diesel engine in order to meet environmental standards. The cleaning of the bunker oil has another beneficial effect which will be described here in detail. There are currently commercial systems that are placed in the smoke stack of the exhaust fuel of the combustion of diesel fuel in order to remove additional particulates and pollutants from the air after the fuel has been burned. These include nitric oxide scrubbers to remove NOx and various combinations thereof as well as scrubbers which remove other types of chemicals. Unfortunately, if the content of the sulfur in the exhaust smoke exceeds 1%, the scrubbers are clogged and become ineffective to remove any pollutants at all. Previously, it was not possible to place scrubbers in the smoke stack exhausts of diesel engines burning bunker oil because the sulfur content as well as other pollutants prevented the use of such scrubbers and other catalytic converters in the exhaust. However, the use of the present system and the various embodiments results in exhaust that is sufficient clean that a catalytic converter or other appropriate scrubber can be placed in the exhaust gas and even more pollutants can be removed than was previously considered possible resulting in a very clean exhaust output from large cargo ships which previously have been the source of a large amount of pollution.

Accordingly, one combination of the embodiments of the invention as described herein includes the system 10 or the system 100 for first removing a large number of contaminants and, in particular, sulfur from the diesel fuel before it is burned and then this is combined with exhaust scrubbers, catalytic converters and other systems in the exhaust gas smoke stack to remove even more of the pollutants that it was previously not possible to remove because of the high sulfur content of the exhaust. This, therefore, provides additional benefits which are unexpected and could not previously be attained.

A further advantage is that heat recapture coils can be placed in the exhaust stack to remove a significant amount of heat from the exhaust gas before it exits from the smoke stack. In particular, a large number of coils which have water circulating therethrough can be placed in the exhaust gas as it exits the smoke stack in order to heat the water to a high temperature for use in other places in the ship. A large amount of heat can be extracted from the exhaust gas prior to exit into the atmosphere and, thus, providing significantly more efficient use of the burned fuel than was previously possible.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system, comprising:
a first oil cleaning stage that includes:
 a heater that receives uncleaned oil and heats the uncleaned oil;
 a first water and oil mixer that receives the heated uncleaned oil at one inlet and recycled water at a second inlet and mixes the water and oil together to form an emulsion;
 a first water/oil separator that receives the emulsion directly from the water and fuel mixer, separates the water and oil from each other to obtain waste water and once cleaned oil and that outputs the waste water to a waste water location and the once cleaned oil to a second location; and
 a transfer pipe that directly transfers the first emulsion from the first mixer to the first water/oil separator; and
a second oil cleaning stage that includes:
 a clean water inlet source that provides clean water;
 a water chemical treatment stage that mixes a selected chemical compound into the clean water to obtained chemically treated water;
 a second fuel mixer having a once cleaned fuel inlet that receives the once cleaned oil to be used as a fuel, a chemically treated water inlet that receives the chemically treated water, and a mixed emulsion outlet that outputs the emulsion of oil and the chemically treated water;
a microcavitation chamber coupled to the mixed emulsion outlet that receives the emulsion directly from the fuel mixer;
a reaction chamber coupled directly to the output of the microcavitation chamber, the reaction chamber having an inlet, an outlet, and an enclosed cavity, a fluid pathway of emulsion through the enclosed cavity from the inlet and to the outlet, a first electrode plate and a second electrode plate in the enclosed cavity, the first electrode plate coupled to a first signal line and the second electrode plate coupled to a second signal line, the first electrode plate electrically coupled to the second electrode plate; and
a second water/oil separator coupled to the reaction chamber, the second water/oil separator having a clean fuel outlet that outputs cleaned oil for use as a fuel, a recycled water outlet that outputs water removed from the emulsion to the recycled water inlet of the first oil and water mixer and a waste outlet that outputs waste material removed from the oil.

2. The system of claim 1, wherein the microcavitation chamber includes a plurality of acoustic wave generators coupled to a wall of the microcavitation chamber.

3. The system of claim 1, wherein a first segment of the fluid pathway is between the first electrode plate and the second electrode plate.

4. The system of claim 1, further comprising:
an ultralow frequency coil coupled to the fuel mixer.

5. The system of claim 1, wherein the heater includes a heat exchanger, the heat exchanger having a high temperature side and a low temperature side, the low temperature side coupled to a settling tank and the unclean fuel inlet of the fuel mixer.

6. The system of claim 5, wherein the high temperature side of the heat exchanger is coupled to the clean fuel outlet of the fuel separator.

7. The system of 1, further comprising:
a recirculation system, the recirculation system including:
a fuel tester coupled to the clean fuel outlet of the fuel separator; and
a valve coupled to the fuel tester and to the unclean fuel input of the fuel mixer.

8. The system of claim 1, wherein the chemically treated water inlet is a water and sodium hydroxide mixture inlet or is a water and magnesium oxide mixture inlet.

9. The system of claim 1, wherein the waste outlet of the fuel separator includes a waste water outlet and a sludge outlet.

10. The system of claim 1 wherein the selected chemical compound is sodium hydroxide.

11. The system of claim 1 wherein the selected chemical compound is magnesium oxide.

12. A system, comprising:
a first oil cleaning stage that includes:
a heater that receives uncleaned oil and heats the uncleaned oil;
a first water and oil mixer that receives the heated fuel at one inlet and recycled water at a second inlet and mixes the water and oil together to form an emulsion;
a first water/oil separator that receives the emulsion directly from the water and fuel mixer, separates the water and oil from each other to obtain waste water and once cleaned oil and that outputs the waste water to a waste water location and the once cleaned oil to a second location; and
a transfer pipe that directly transfers the first emulsion from the mixer to the water/oil separator stage; and
a second oil cleaning stage that includes:
a clean water inlet source that provides clean water;
a fuel mixer having an unclean fuel inlet that receives oil to be used as a fuel, a water inlet and a mixed emulsion outlet that outputs the emulsion of oil and water;
a microcavitation chamber coupled to the mixed emulsion outlet that receives the emulsion from the fuel mixer, the microcavitation chamber having a plurality of acoustic wave output devices coupled thereto that apply an acoustic wave to the emulsion while it is in the microcavitation chamber, the microcavitation chamber outputting the emulsion after it has been subject to the acoustic waves;
a reaction chamber coupled to the output of the microcavitation chamber, the reaction chamber having an inlet, an outlet, and an enclosed cavity, a fluid pathway of emulsion through the enclosed cavity from the inlet and to the outlet, a first electrode plate and a second electrode plate in the enclosed cavity, the first electrode plate coupled to a first signal line and the second electrode plate coupled to a second signal line, the first electrode plate electrically coupled to the second electrode plate; and
a second water/oil separator coupled to the reaction chamber, the second water/oil separator having a clean fuel outlet that outputs cleaned oil for use as a fuel, a recycled water outlet that outputs water removed from the emulsion to the recycled water inlet of the first oil and water mixer and a waste outlet that outputs waste material removed from the fuel.

* * * * *